United States Patent
Wilber et al.

(10) Patent No.: US 12,460,727 B2
(45) Date of Patent: Nov. 4, 2025

(54) SELF-CENTERING SEAL AND METHOD OF USING SAME

(71) Applicant: United Technologies Corporation, Farmington, CT (US)

(72) Inventors: John E. Wilber, Marlborough, CT (US); Holly Teufel, Salt Lake City, UT (US)

(73) Assignee: RTX CORPORATION, Farmington, CT (US)

( * ) Notice: Subject to any disclaimer, the term of this patent is extended or adjusted under 35 U.S.C. 154(b) by 1599 days.

(21) Appl. No.: 16/576,876

(22) Filed: Sep. 20, 2019

(65) Prior Publication Data

US 2021/0088144 A1 Mar. 25, 2021

(51) Int. Cl.
*F16J 15/34* (2006.01)
*F16J 15/3212* (2016.01)
(Continued)

(52) U.S. Cl.
CPC ....... *F16J 15/3452* (2013.01); *F16J 15/3212* (2013.01); *F16J 15/3272* (2013.01);
(Continued)

(58) Field of Classification Search
CPC .. F16J 15/3212; F16J 15/3272; F16J 15/3292; F16J 15/3452; F16J 15/3472;
(Continued)

(56) References Cited

U.S. PATENT DOCUMENTS 1,041,534 A * 10/1912 Wagner ................... F16J 15/28
                                                              277/545
2,600,991 A *  6/1952 Hargrove ............... F16J 15/442
                                                              277/416
(Continued)

FOREIGN PATENT DOCUMENTS

EP     3312389 B1     6/2019
EP     3726105 A1 * 10/2020    ............. F16J 15/324
(Continued)

OTHER PUBLICATIONS

EP search report for EP20195152.2 dated Feb. 22, 2021.

*Primary Examiner* — Christine M Mills
*Assistant Examiner* — L. Susmitha Koneru
(74) *Attorney, Agent, or Firm* — Getz Balich LLC

(57) ABSTRACT

A seal includes a seal body disposed about a seal axis and configured to be mounted to a first component at a second axial end of the seal body. The seal body includes an interior surface defining a seal gland circumferentially extending about the seal axis. A packing is disposed within the seal gland. A retaining ring is in communication with a second radial side of the packing and is disposed within the seal gland. A plurality of exciter springs are mounted to a second radial side of the retaining ring. The plurality of exciter springs are biased against the interior surface of the seal body and are configured to center the packing within the seal body. The packing is configured to receive a second component and form a seal interface between the packing and the (Continued)

second component. The seal body is configured to form a portion of a passage.

13 Claims, 7 Drawing Sheets

(51) Int. Cl.
  *F16J 15/3272* (2016.01)
  *F16J 15/3292* (2016.01)
  *F01D 11/00* (2006.01)
  *F01D 17/14* (2006.01)
(52) U.S. Cl.
  CPC ....... *F16J 15/3292* (2013.01); *F16J 15/3472* (2013.01); *F01D 11/003* (2013.01); *F01D 11/005* (2013.01); *F01D 17/145* (2013.01); *F05D 2250/192* (2013.01); *F05D 2250/292* (2013.01); *F05D 2260/38* (2013.01)
(58) Field of Classification Search
  CPC .... F01D 11/003; F01D 11/005; F01D 17/145; F05D 2250/192; F05D 2250/292; F05D 2260/38; F02C 7/12; F02C 7/18; F02K 3/02; F02K 3/025; F02K 3/06
  See application file for complete search history.

(56) References Cited

U.S. PATENT DOCUMENTS

| | | | | |
|---|---|---|---|---|
| 2,731,278 | A | | 1/1956 | Soderstrom |
| 3,545,771 | A | * | 12/1970 | Downing ............. F16J 15/3272 277/576 |
| 3,768,817 | A | * | 10/1973 | Daniels ................... F16J 9/061 415/117 |
| 3,991,588 | A | * | 11/1976 | Laskaris ................... H01F 6/04 62/505 |
| 5,374,068 | A | * | 12/1994 | Jewett ..................... F16J 15/441 277/303 |
| 6,840,358 | B2 | * | 1/2005 | Kos ....................... F16J 15/3224 277/352 |
| 6,886,532 | B2 | * | 5/2005 | Nohara ................. F02M 35/024 123/401 |
| 7,291,946 | B2 | * | 11/2007 | Clouse ..................... F01D 11/08 415/119 |
| 10,041,579 | B2 | | 8/2018 | Venter |
| 10,316,891 | B2 | | 6/2019 | Venter |
| 10,330,012 | B2 | * | 6/2019 | Banhos ..................... F02C 7/12 |
| 10,487,687 | B1 | * | 11/2019 | Sadil ......................... F02C 7/28 |
| 10,865,896 | B2 | * | 12/2020 | Zonneveld ............ F16K 27/045 |
| 11,333,259 | B2 | * | 5/2022 | Zonneveld .............. F16K 11/22 |
| 2002/0117807 | A1 | | 8/2002 | Yoshida |
| 2002/0129780 | A1 | * | 9/2002 | Nohara ................ F02D 13/0226 123/90.27 |
| 2004/0134731 | A1 | * | 7/2004 | Kos ....................... F16J 15/3224 188/322.16 |
| 2004/0145251 | A1 | * | 7/2004 | Clouse .................... F01D 9/042 310/51 |
| 2008/0100000 | A1 | * | 5/2008 | Justak ..................... F16J 15/442 277/355 |
| 2009/0115141 | A1 | * | 5/2009 | Simmons ................ F01D 9/023 277/630 |
| 2015/0369474 | A1 | * | 12/2015 | Nakano ................... F23C 10/18 110/245 |
| 2016/0348587 | A1 | * | 12/2016 | Banhos ..................... F02C 7/20 |
| 2016/0376904 | A1 | * | 12/2016 | Schwarz .................. F16J 15/44 415/230 |
| 2018/0058240 | A1 | * | 3/2018 | Chuong ................. F16J 15/442 |
| 2018/0306042 | A1 | * | 10/2018 | Zaccardi ............... F04D 29/063 |
| 2019/0178166 | A1 | * | 6/2019 | Miller ................... F01D 11/003 |
| 2019/0264824 | A1 | * | 8/2019 | Zonneveld ............. F16K 3/085 |
| 2020/0332899 | A1 | * | 10/2020 | Amador ................. F01D 25/183 |
| 2021/0054937 | A1 | * | 2/2021 | Chuong ................. F16J 15/442 |
| 2023/0146084 | A1 | * | 5/2023 | Sharma ................. F01D 25/125 415/208.1 |

FOREIGN PATENT DOCUMENTS

| | | |
|---|---|---|
| GB | 724159 A | 2/1955 |
| JP | 2003004145 A | 1/2003 |

* cited by examiner

SELF-CENTERING SEAL AND METHOD OF USING SAME

BACKGROUND

1. Technical Field

This disclosure relates generally to gas turbine engines, and more particularly to seals for use in a gas turbine engine.

2. Background Information

Modern gas turbine engines may include a number of components which may be readily replaced by technicians during maintenance or repair of the gas turbine engine. These components may be designated as line replaceable units (LRUs) and may be able to be quickly substituted with equivalent components with limited operation of fasteners, connectors, etc. required to secure the components.

However, some line replaceable units may still be difficult to replace as a result of their orientation and/or location within the gas turbine engine. For example, the line replaceable unit may be installed in the gas turbine engine at a position which the technician cannot easily observe. Further, the line replaceable unit may require the technician to support the unit with one hand while attempting to fasten the unit in the proper position with the technician's other hand. As a result, replacement of some line replaceable units may be more time consuming and complex than intended and additionally may increase the likelihood of incorrect installation of the line replaceable units. Accordingly, systems and methods addressing one or more of the above-noted concerns would find utility.

SUMMARY

According to an embodiment of the present disclosure, a seal includes a seal body disposed about a seal axis and configured to be mounted to a first component at a second axial end of the seal body. The seal body includes an interior surface defining a seal gland circumferentially extending about the seal axis. A packing is disposed within the seal gland. A retaining ring is in communication with a second radial side of the packing and is disposed within the seal gland. A plurality of exciter springs is mounted to a second radial side of the retaining ring and circumferentially spaced about the retaining ring. The plurality of exciter springs is biased against the interior surface of the seal body and are configured to center the packing within the seal body. The packing is configured to receive a second component and form a seal interface between the packing and the second component. The seal body is configured to form a portion of a passage extending through the seal body, the first component, and the second component.

In the alternative or additionally thereto, in the foregoing embodiment, the packing is configured to move radially within the seal gland between a first radial position and a second radial position different than the first radial position.

In the alternative or additionally thereto, in the foregoing embodiment, the seal body includes a first axial end opposite the second axial end. The first axial end of the seal body includes a flared portion projecting radially outward with respect to the seal axis.

In the alternative or additionally thereto, in the foregoing embodiment, the packing includes a first radial side opposite the second radial side of the packing and a first axial side and a second axial side opposite the first axial side. The packing further includes a first chamfer disposed between the first radial side and the first axial side.

In the alternative or additionally thereto, in the foregoing embodiment, the packing includes a second chamfer disposed between the first radial side and the second axial side.

In the alternative or additionally thereto, in the foregoing embodiment, each exciter spring of the plurality of exciter springs includes a middle portion mounted to the second radial side of the retaining ring and opposing end portions in contact with the interior surface of the seal body.

In the alternative or additionally thereto, in the foregoing embodiment, the retaining ring defines a gap portion disposed along a portion of a circumference of the retaining ring.

According to another embodiment of the present disclosure, a gas turbine engine includes a valve, a collector, and a seal. The seal includes a seal body mounted to the collector at a second axial end of the seal body. The seal body is disposed about a seal axis and includes an interior surface defining a seal gland circumferentially extending about the seal axis. A packing is disposed within the seal gland. A retaining ring is in communication with a second radial side of the packing and is disposed within the seal gland. A plurality of exciter springs is mounted to a second radial side of the retaining ring and circumferentially spaced about the retaining ring. The plurality of exciter springs is biased against the interior surface of the seal body and configured to center the packing within the seal body. The packing forms a seal interface between the packing and the valve. The seal body is configured to form a portion of a passage extending through the seal body, the collector, and the valve.

In the alternative or additionally thereto, in the foregoing embodiment, the valve is in fluid communication with a bypass flowpath of the gas turbine engine.

In the alternative or additionally thereto, in the foregoing embodiment, the gas turbine engine further includes a turbine case, wherein the valve, the seal, and the collector are configured to direct air from the bypass flowpath to the turbine case for cooling of the turbine case.

In the alternative or additionally thereto, in the foregoing embodiment, the second axial end of the seal body is welded to the collector.

In the alternative or additionally thereto, in the foregoing embodiment, the valve is configured to move axially within the seal between a first axial position and a second axial position different than the first axial position. The seal is configured to maintain the seal interface between the packing and the valve with the valve in the first axial position and the second axial position.

In the alternative or additionally thereto, in the foregoing embodiment, the packing is configured to move radially within the seal gland between a first radial position and a second radial position different than the first radial position.

In the alternative or additionally thereto, in the foregoing embodiment, the seal body includes a first axial end opposite the second axial end. The first axial end of the seal body includes a flared portion projecting radially outward with respect to the seal axis.

In the alternative or additionally thereto, in the foregoing embodiment, the packing includes a first radial side opposite the second radial side of the packing and a first axial side and a second axial side opposite the first axial side. The packing further includes a first chamfer disposed between the first radial side and the first axial side.

In the alternative or additionally thereto, in the foregoing embodiment, the packing includes a second chamfer disposed between the first radial side and the second axial side.

In the alternative or additionally thereto, in the foregoing embodiment, each exciter spring of the plurality of exciter springs includes a middle portion mounted to the second radial side of the retaining ring and opposing end portions in contact with the interior surface of the seal body.

According to another embodiment of the present disclosure, a method for forming a seal interface between a collector and a valve of a gas turbine engine is provided. The method includes providing the collector and providing a seal. The seal includes a seal body mounted to the collector at a second axial end of the seal body. The seal body is disposed about a seal axis and includes an interior surface defining a seal gland circumferentially extending about the seal axis. A packing is disposed within the seal gland. A retaining ring is in communication with a second radial side of the packing and disposed within the seal gland. A plurality of exciter springs is mounted to a second radial side of the retaining ring and circumferentially spaced about the retaining ring. The plurality of exciter springs is biased against the interior surface of the seal body and configured to center the packing within the seal body. The method further includes forming a seal interface between the collector and the valve by inserting the valve into the seal such that the packing forms the seal interface between the packing and the valve. The seal body forms a portion of a passage extending through the seal body, the collector, and the valve.

In the alternative or additionally thereto, in the foregoing embodiment, the seal body includes a first axial end opposite the second axial end. The first axial end of the seal body includes a flared portion projecting radially outward with respect to the seal axis.

In the alternative or additionally thereto, in the foregoing embodiment, the packing includes a first radial side opposite the second radial side of the packing and a first axial side and a second axial side opposite the first axial side. The packing further includes a first chamfer disposed between the first radial side and the first axial side.

The present disclosure, and all its aspects, embodiments and advantages associated therewith will become more readily apparent in view of the detailed description provided below, including the accompanying drawings.

DETAILED DESCRIPTION

Figure 1A:
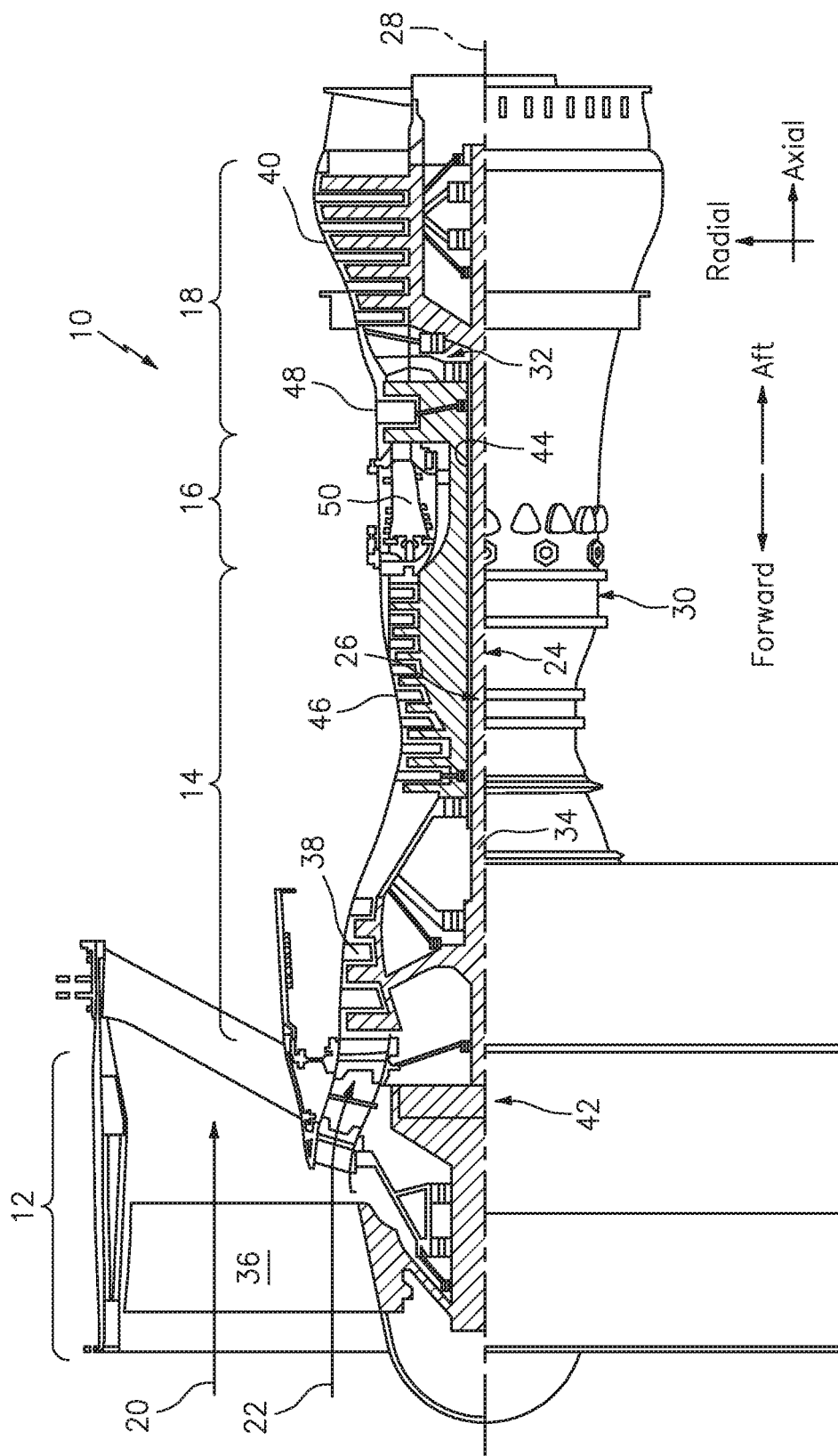
FIG. 1A illustrates a side cross-sectional view of a gas turbine engine in accordance with one or more embodiments of the present disclosure.
Figure 1B:
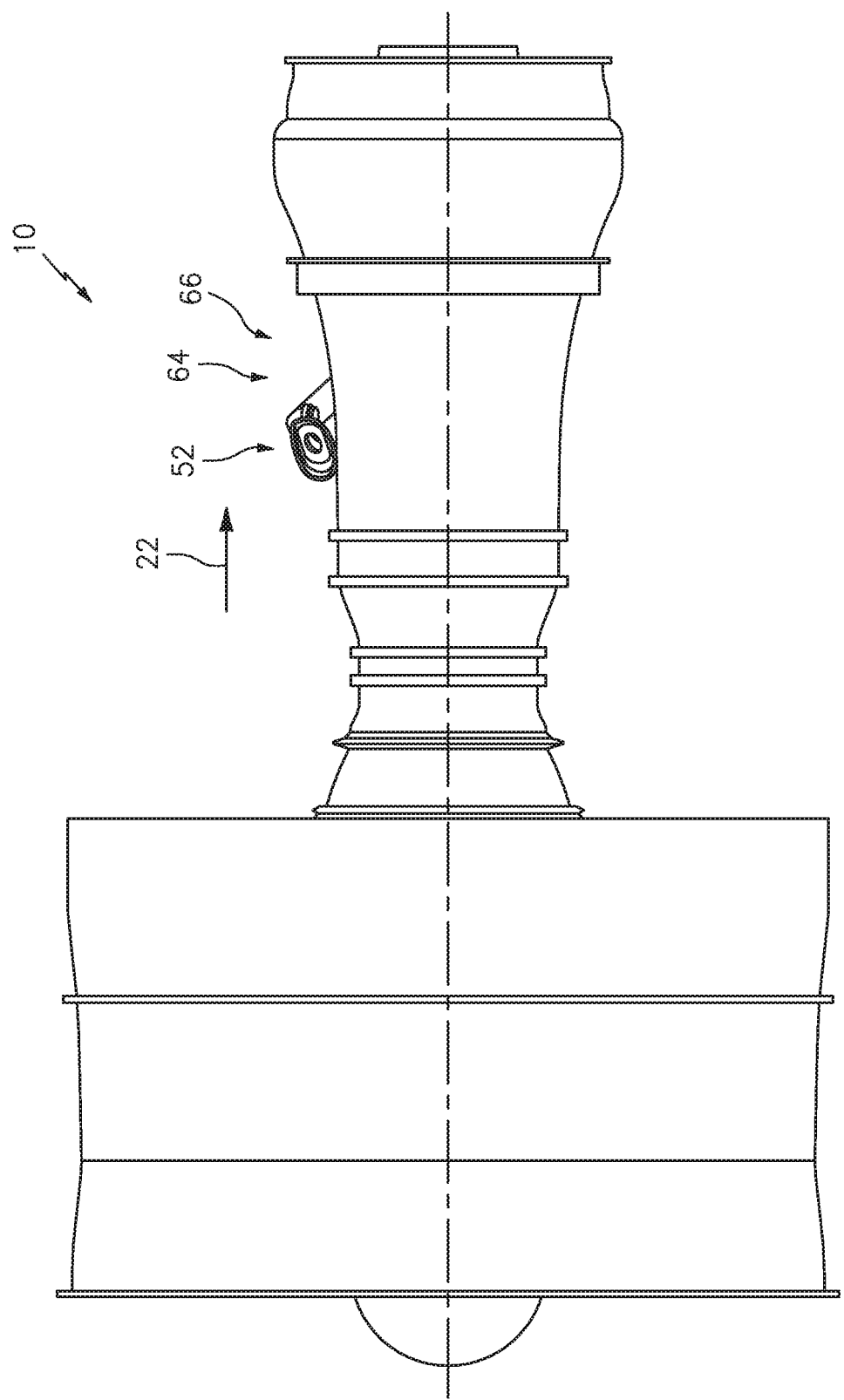
FIG. 1B illustrates a side cross-sectional view of a gas turbine engine in accordance with one or more embodiments of the present disclosure.
Figure 2:
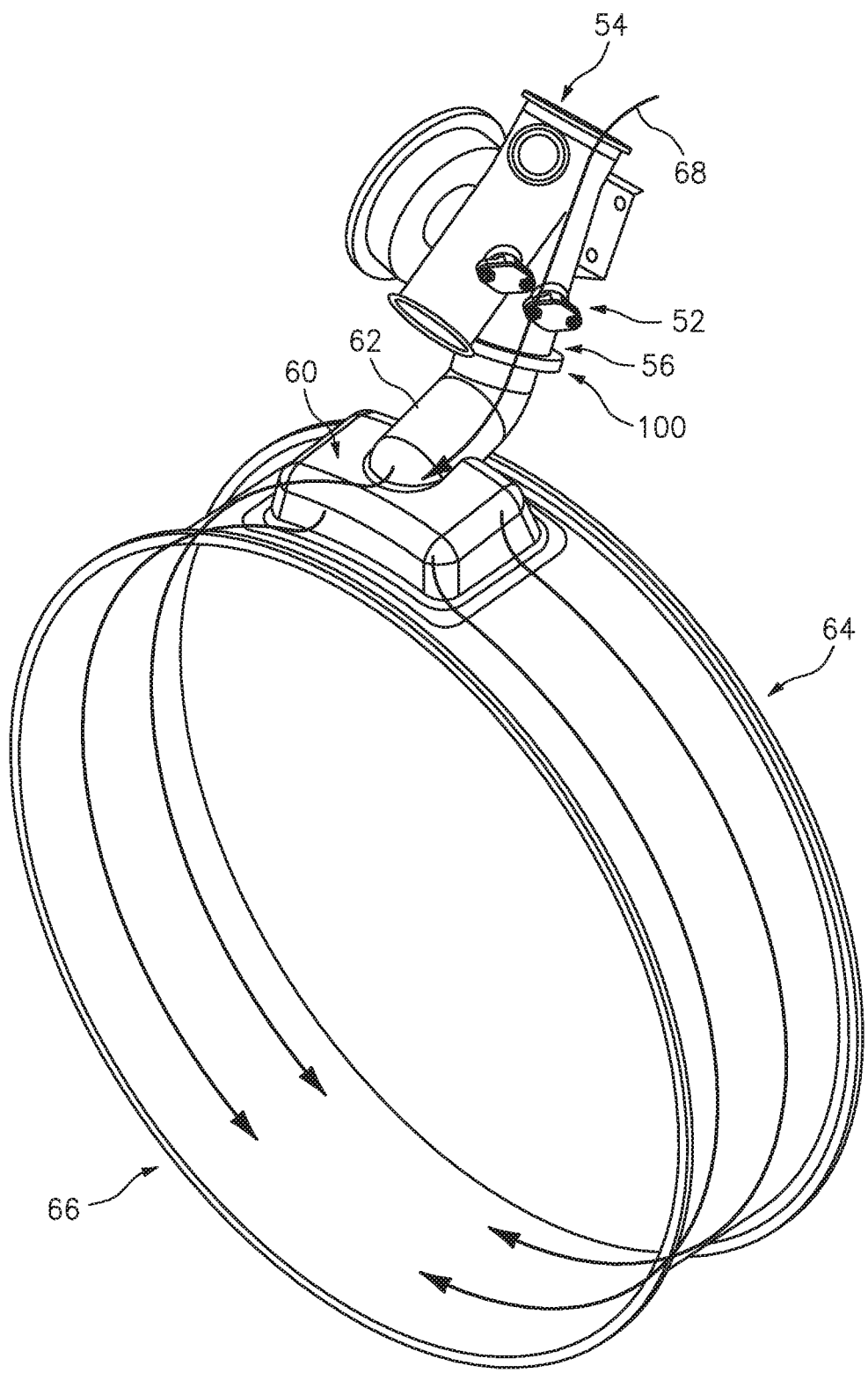
FIG. 2 illustrates a perspective view of a portion of the gas turbine engine of FIG. in accordance with one or more embodiments of the present disclosure. 1B.
Figure 3:
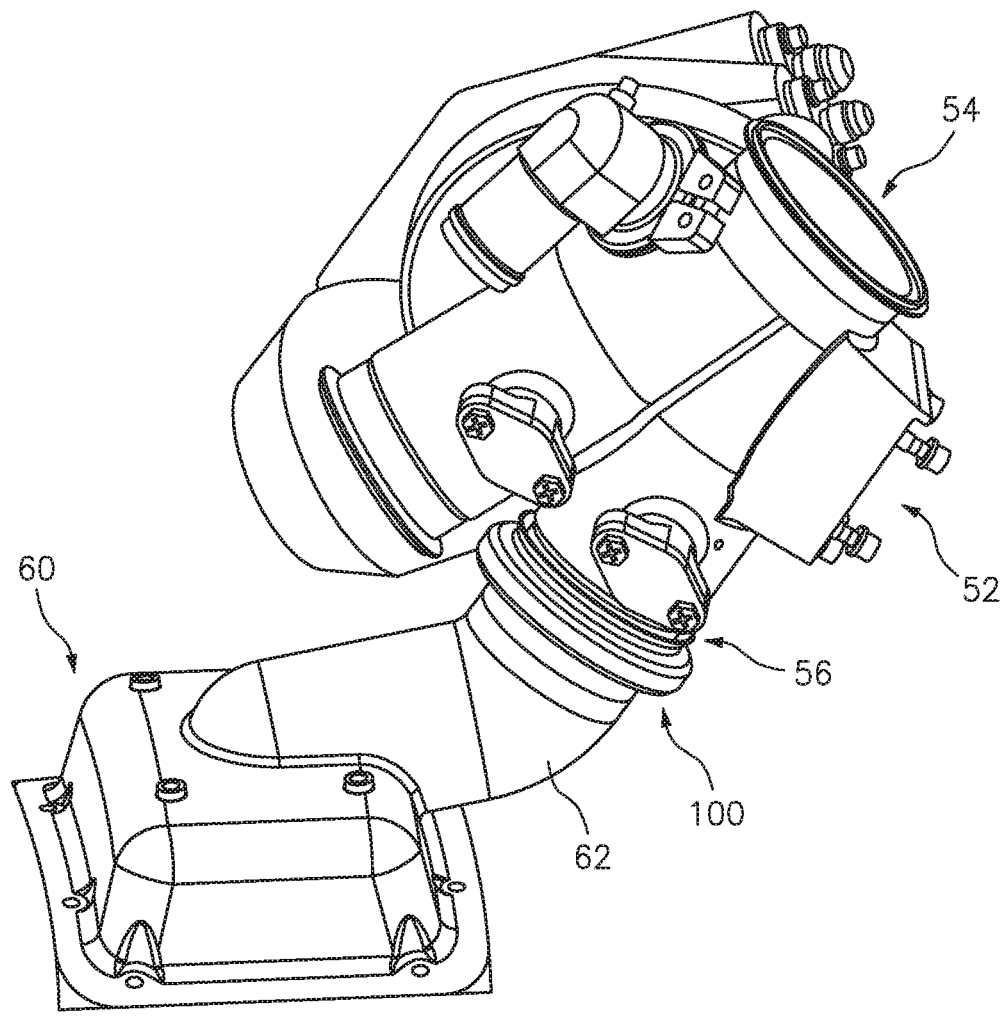
FIG. 3 illustrates a collector connected a valve with a seal in accordance with one or more embodiments of the present disclosure.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Referring to FIG. 1A, an exemplary gas turbine engine 10 is schematically illustrated. The gas turbine engine 10 is disclosed herein as a two-spool turbofan engine that generally includes a fan section 12, a compressor section 14, a combustor section 16, and a turbine section 18. The fan section 12 drives air along a bypass flowpath 20 while the compressor section 14 drives air along a core flowpath 22 for compression and communication into the combustor section 16 and then expansion through the turbine section 18. Although depicted as a turbofan gas turbine engine in the disclosed non-limiting embodiments, it should be understood that the concepts described herein are not limited to use with turbofans as the teachings may be applied to other types of turbine engines including those with three-spool architectures.

The gas turbine engine 10 generally includes a low-pressure spool 24 and a high-pressure spool 26 mounted for rotation about a longitudinal centerline 28 of the gas turbine engine 10 relative to an engine static structure 30 via one or more bearing systems 32. It should be understood that various bearing systems 32 at various locations may alternatively or additionally be provided.

The low-pressure spool 24 generally includes a first shaft 34 that interconnects a fan 36, a low-pressure compressor 38, and a low-pressure turbine 40. The first shaft 34 is connected to the fan 36 through a gear assembly of a fan drive gear system 42 to drive the fan 36 at a lower speed than the low-pressure spool 24. The high-pressure spool 26 generally includes a second shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. A combustor 50 is disposed between the high-pressure compressor 46 and the high-pressure turbine 48 along the longitudinal centerline 28. The first shaft 34 and the second shaft 44 are concentric and rotate via the one or more bearing systems 32 about the longitudinal centerline 28 which is collinear with respective longitudinal centerlines of the first and second shafts 34, 44.

Airflow along the core flowpath 22 is compressed by the low-pressure compressor 38, then the high-pressure compressor 46, mixed and burned with fuel in the combustor 50, and then expanded over the high-pressure turbine 48 and the low-pressure turbine 40. The low-pressure turbine 40 and the high-pressure turbine 48 rotationally drive the low spool 24 and the high spool 26, respectively, in response to the expansion.

Referring to FIGS. 1B-3, the gas turbine engine 10 includes a valve 52 disposed in fluid communication with the bypass flowpath 20. The valve 52 includes an inlet 54 configured to receive air from the bypass flowpath 20 and an outlet 56 configured to direct the air from the bypass flowpath 20 out of the valve 52. The gas turbine engine 10 further includes a collector 60 having a neck 62 in fluid communication with the outlet 56 of the valve 52 via a seal 100. The collector 60 is configured to direct the air from the bypass flowpath 20 into one or both of a high-pressure turbine case 64 and a low-pressure turbine case 66 for cooling of the cases 64, 66. The cases 64, 66 are cooling by the air from the bypass flowpath 20, shrink, and thus lessen the gap around rotating turbine blades of the respective high-pressure turbine 48 and low-pressure turbine 40. The reduced leakage of air past the blade tips of the rotating turbine blades, as a result of the air cooling, increases fuel efficiency of the gas turbine engine.

Figure 4:
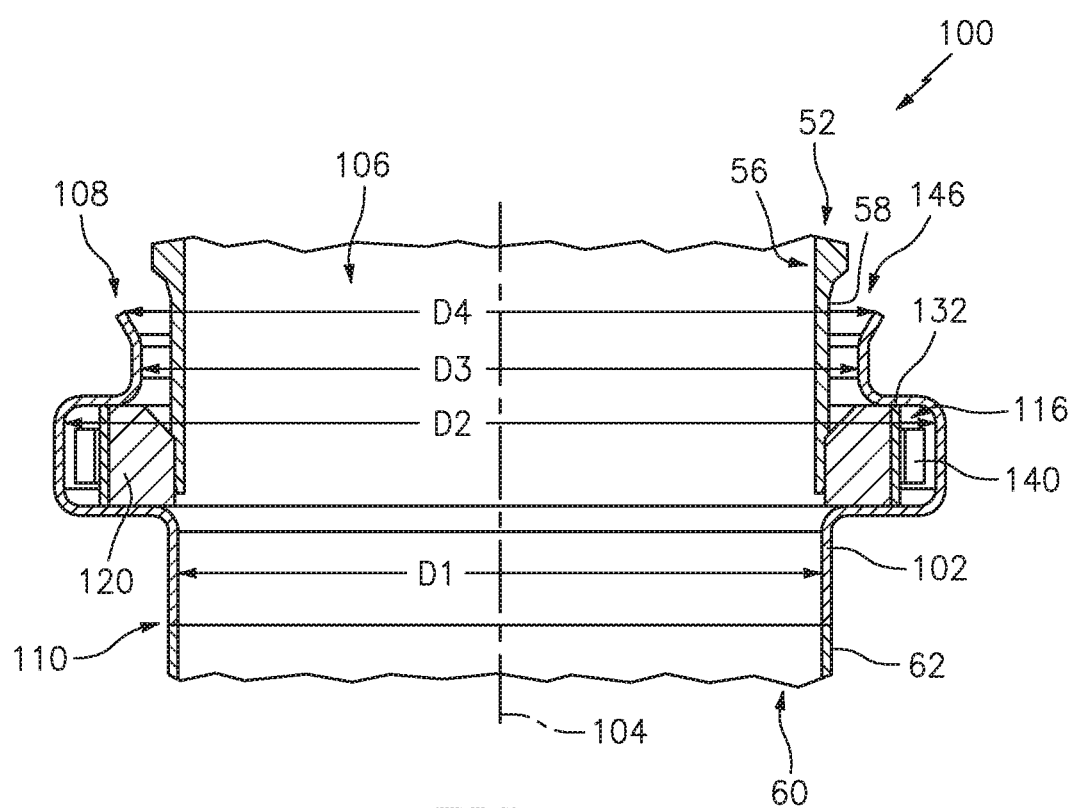
FIG. 4 illustrates a side, cross-sectional view of the seal of FIG. 3 in accordance with one or more embodiments of the present disclosure.
Figure 5:
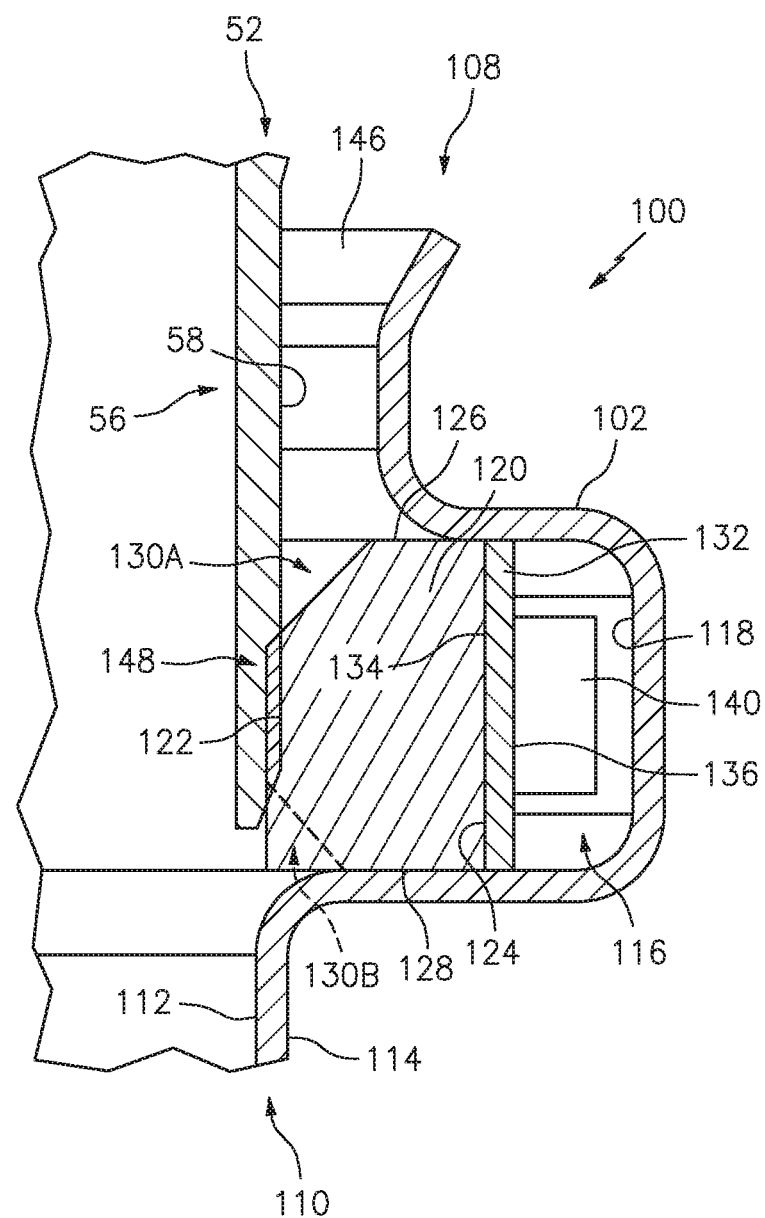
FIG. 5 illustrates a side, cross-sectional view of a portion of the seal of FIG. 3 in accordance with one or more embodiments of the present disclosure.
Figure 6:
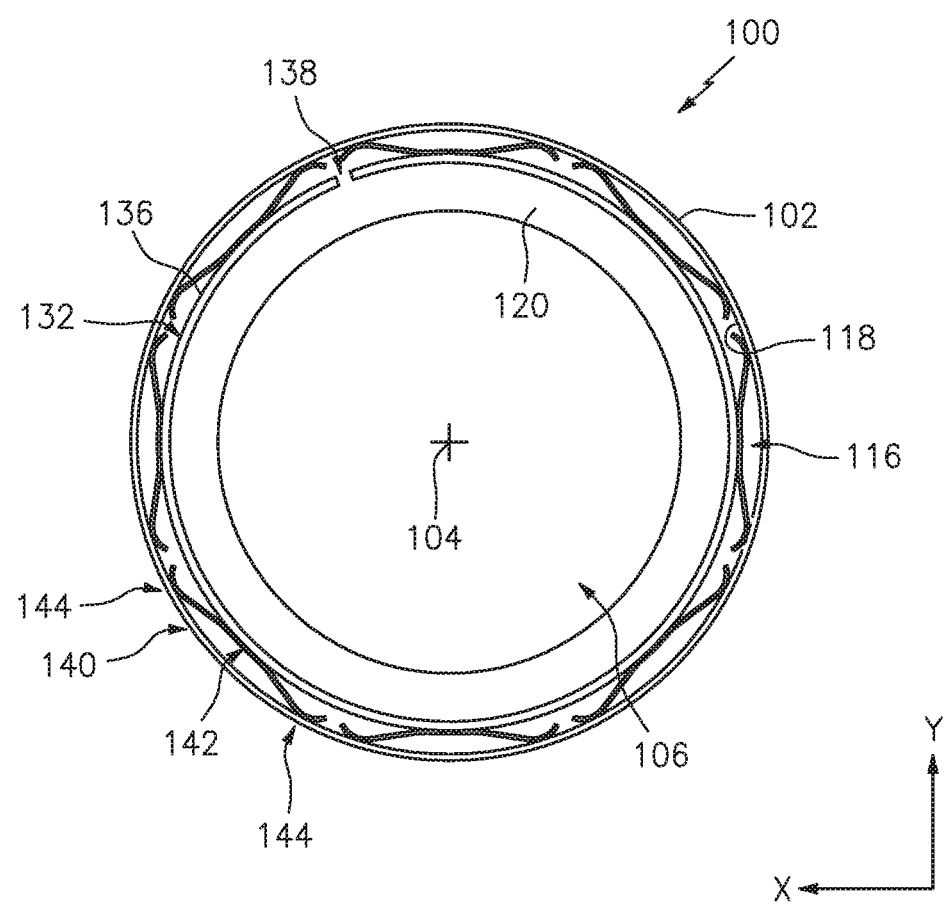
FIG. 6 illustrates a top, cross-sectional view of the seal of FIG. 3 in accordance with one or more embodiments of the present disclosure.

Referring to FIGS. 4-6, the seal 100 includes a seal body 102 disposed about a seal axis 104. The seal body 104 forms a portion of an air passage 106 extending through the seal body 104, the collector 60, and the valve 52. The seal body 104 extends between a first axial end 108 and a second axial end 110 opposite the first axial end 108. The seal body 104 includes an interior surface 112 and an exterior surface 114 with each surface 112, 114 extending between the first axial end 108 and the second axial end 110.

The interior surface 112 of the seal body 104 defines a seal gland 116 extending circumferentially about the seal axis 104. The seal gland 116 includes an inner radial surface 118 which is a portion of the interior surface 112 of the seal body 102. An annular packing 120 is disposed, at least in part, within the seal gland 116 (e.g., radially within the seal gland 116). The packing 120 includes a first radial side 122 facing the seal axis 104 and a second radial side 124 opposite the first radial side 122. The packing 120 also includes a first axial side 126 corresponding to the first axial end 108 of the seal body 102 and a second axial side 128 opposite the first axial side 126 and corresponding to the second axial end 110 of the seal body 102. The packing 120 is configured to receive the outlet 56 of the valve and the first radial side 122 of the packing 120 is configured to form a seal interface 148 about an exterior surface 58 of the outlet 56 of the valve 52 when the valve 52 is inserted into the seal 100.

During installation of the valve 52 or operation of the gas turbine engine 10, the valve 52 may move axially within the seal 100 between a first axial position and a second axial position different than the first axial position. The seal 100 may be configured to maintain the seal interface 148 between the packing 120 and the valve 52 with the valve 52 in either of the first axial position or the second axial position. State slightly differently, the seal 100 may maintain the seal interface 148 between the first radial side 122 of the packing 120 and the exterior surface 58 of the outlet 56 of the valve 52 as the valve 52 axially translates within the packing 120.

In various embodiments, the packing 120 may include a first chamfer 130A disposed between the first radial side 122 and the first axial side 126 and extending about the circumference of the packing 120. As the outlet 56 of the valve 52 is inserted into the seal 100, the first chamfer 130A may guide the outlet 56 into engagement with the first radial side 122 of the packing 120 in order to prevent catching or shearing of the packing 120 during installation of the valve 52. In various embodiments, the packing 120 may additionally include a second chamfer 130B disposed between the first radial side 122 and the second axial side 128 and extending about the circumference of the packing 120. Inclusion of the second chamfer 130B, in addition to the first chamber 130A, may provide for mistake-proof installation of the packing 120 within the seal gland 116 by allowing the packing 120 to be installed with either axial side 126, 128 closest to the first axial end 108 of the seal body 102. The chamfers 130A, 130B may have any suitable angle relative to the first radial side 122 of the packing 120. For example, the chamfers 130A, 130B may have an angle of between 10 and 80 degrees or between 30 and 60 degrees relative to the first radial side 122 of the packing 120.

The seal 100 includes a retaining ring 132 in communication with the packing 120 and disposed within the seal gland 116. The retaining ring 132 includes a first radial side 134 in communication with the second radial side 124 of the packing 120. The retaining ring 132 further includes a second radial side 136 opposite the first radial side 134. The retaining ring 132 may include a gap portion 138 disposed along at least a portion of the circumference of the retaining ring 132. The gap portion 138 of the retaining ring 132 may allow the retaining ring 132 to be radially compressed so that the retaining ring 132 can be inserted into the seal body 102 and installed within the seal gland 116.

The seal 100 includes a plurality of exciter springs 140 mounted to the second radial side 136 of the retaining ring 132. The plurality of exciter springs 140 are circumferentially spaced from one another about the second radial side 136 of the retaining ring 132. Each exciter spring of the plurality of exciter springs 140 may include a middle portion 142 and opposing end portions 144 circumferentially spaced from the middle portion 142. The middle portion 142 may be mounted to the second radial side 136 of the retaining ring 132, for example, by a spot weld or other suitable form of attachment. The end portions 144 are configured to contact the inner radial surface 118 of the seal gland 116 so as to radially bias the retaining ring 132 and the packing 120 with respect to the inner radial surface 118. Accordingly, the plurality of exciter springs 140 is configured to radially center the retaining ring 132 and the packing 120 within the seal gland 116, with respect to the seal axis 104. The end portions 144 of the plurality of exciter springs 140 may be curved. For example, a convex surface of the end portions 144 may be in contact with the inner radial surface 118 of the seal gland 116. In various embodiments, the exciter springs 140 may be made from sheet metal or any other suitably rigid material to provide sufficient bias against the inner radial surface 118 of the seal gland 116 to center the packing 120.

As described above, the packing 120 is radially biased, via the retaining ring 132 and the plurality of exciter springs 140, with respect to the inner radial surface 118 of the seal gland 116 and, thus, is configured to form a seal-centering seal with respect to the seal axis 104. Accordingly, the packing 120 is configured for planar displacement within the seal gland 116 such as along the plane including the directions X, Y as shown in FIG. 6. For example, the packing 120 is configured to move radially within the seal gland 116 between a first radial position and a second radial position different than the first radial position. The planar displacement capability of the packing 120 in combination with the first chamfer 130A may additionally prevent catching or shearing of the packing 120 during installation of the valve 52 by allowing the packing 120 to move radially to accommodate misalignment of the valve 52 with the packing 120. Further, the planar displacement capability of the packing 120 may allow the packing 120 to maintain the seal interface 148 with the valve 52 despite some radial movement of the valve 52 with respect to the seal 100 during gas turbine engine 10 operations.

In various embodiments, the seal body 102 may include a flared portion 146 disposed at the first axial end 108 of the seal body 102. The flared portion 146 may project radially outward with respect to the seal axis 104. The flared portion 146 may be flared such that the flared portion 146 has an increasing diameter, with respect to the seal axis 104, along the length of the flared portion 146 in a direction from the second axial end 110 to the first axial end 108 of the seal body 102. The flared portion 146 may assist a technician with guiding the outlet 56 of the valve 52 into the seal body 102.

The seal body 102 may include a first diameter D1 at the second axial end 110 of the seal body 102, a second diameter D2 at the seal gland 116, a third diameter D3 between the seal gland 116 and the flared portion 146 of the seal body 102, and a fourth diameter D4 at the first axial end 108 of the seal body 102. In various embodiments, for example as shown in FIG. 4, the second diameter D2 may be greater than the fourth diameter D4 which may be greater than the third diameter D3 which may be greater than the first diameter D1. However, it should be understood that each of the diameters D1, D2, D3, D4 may be larger or smaller with respect to each other diameter D1, D2, D3, D4 based on, for example, differing sizes and/or shapes of the neck 62 of the collector 60, the outlet 56 of the valve, the packing 120, the retaining ring 132, the exciter springs 140, etc., the radial extent of the flared portion 146 of the seal body 102, and the space in the gas turbine engine 10 in which the seal 100 must be configured to fit.

In various embodiments, the packing 120 may be made from, for example, woven graphite, silicone, polytetrafluoroethylene (PTFE), or any other suitable high-temperature sealing material. In various embodiments, the packing 120 may not be made from a high-temperature and/or fire-resistant material as the seal body 102 may create a tortuous path for flame thereby directing the flame away from the packing 120.

The seal 100 according to one or more embodiments of the present disclosure may allow a technician to more easily mount the valve 52 in fluid communication with the collector 60. For example, the flared portion 146 of the seal body 102 and/or the self-centering features of the packing 120 may allow the valve 52 to be installed properly within the seal 100 while preventing or reducing the risk of damaging the packing 120 during valve 52 installation. The seal 100 may additionally mitigate axial and/or radial load transmittal from valve 52 movement to the collector 60 and associated turbine cases 64, 66.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Accordingly, the present disclosure is not to be restricted except in light of the attached claims and their equivalents.

What is claimed is:

1. A gas turbine engine comprising:
a valve;
a collector; and
a seal comprising:
a seal body mounted to the collector at a second axial end of the seal body, the seal body disposed about a seal axis and comprising an interior surface defining a seal gland circumferentially extending about the seal axis;
a packing disposed within the seal gland;
a retaining ring in communication with a second radial side of the packing and disposed within the seal gland; and
a plurality of exciter springs mounted to a second radial side of the retaining ring and circumferentially spaced about the retaining ring, the plurality of exciter springs biased against the interior surface of the seal body and configured to center the packing within the seal body,
wherein the packing forms a seal interface between the packing and the valve and wherein the seal body is configured to form a portion of a passage extending through the seal body, the collector, and the valve.

2. The gas turbine engine of claim 1, wherein the valve is in fluid communication with a bypass flowpath of the gas turbine engine.

3. The gas turbine engine of claim 2, further comprising a turbine case, wherein the valve, the seal, and the collector are configured to direct air from the bypass flowpath to the turbine case for cooling of the turbine case.

4. The gas turbine engine of claim 1, wherein the second axial end of the seal body is welded to the collector.

5. The gas turbine engine of claim 1, wherein the valve is configured to move axially within the seal between a first axial position and a second axial position different than the first axial position and wherein the seal is configured to maintain the seal interface between the packing and the valve with the valve in the first axial position and the second axial position.

6. The gas turbine engine of claim 5, wherein the packing is configured to move radially within the seal gland between a first radial position and a second radial position different than the first radial position.

7. The gas turbine engine of claim 1, wherein the seal body comprises a first axial end opposite the second axial end and wherein the first axial end of the seal body comprises a flared portion projecting radially outward with respect to the seal axis.

8. The gas turbine engine of claim 1, wherein the packing comprises a first radial side opposite the second radial side of the packing and a first axial side and a second axial side opposite the first axial side and wherein the packing further comprises a first chamfer disposed between the first radial side and the first axial side.

9. The gas turbine engine of claim 8, wherein the packing comprises a second chamfer disposed between the first radial side and the second axial side.

10. The gas turbine engine of claim 1, wherein each exciter spring of the plurality of exciter springs includes a middle portion mounted to the second radial side of the retaining ring and opposing end portions in contact with the interior surface of the seal body.

11. A method for forming a seal interface between a collector and a valve of a gas turbine engine, the method comprising:
- providing the collector;
- providing a seal comprising:
  - a seal body mounted to the collector at a second axial end of the seal body, the seal body disposed about a seal axis and comprising an interior surface defining a seal gland circumferentially extending about the seal axis;
  - a packing disposed within the seal gland;
  - a retaining ring in communication with a second radial side of the packing and disposed within the seal gland; and
  - a plurality of exciter springs mounted to a second radial side of the retaining ring and circumferentially spaced about the retaining ring, the plurality of exciter springs biased against the interior surface of the seal body and configured to center the packing within the seal body; and forming a seal interface between the collector and the valve by inserting the valve into the seal such that the packing forms the seal interface between the packing and the valve, wherein the seal body forms a portion of a passage extending through the seal body, the collector, and the valve.

12. The method of claim 11, wherein the seal body comprises a first axial end opposite the second axial end and wherein the first axial end of the seal body comprises a flared portion projecting radially outward with respect to the seal axis.

13. The method of claim 12, wherein the packing comprises a first radial side opposite the second radial side of the packing and a first axial side and a second axial side opposite the first axial side and wherein the packing further comprises a first chamfer disposed between the first radial side and the first axial side.

* * * * *